Nov. 8, 1960   F. A. McCORMICK ET AL   2,958,882
APPARATUS FOR CLEANING CORRUGATED PARTITION STRIPS
Filed July 30, 1958   3 Sheets-Sheet 1

INVENTORS
FRANCIS A. McCORMICK
& GLENN W. MAZE
BY J. L. Nelson
W. A. Schaich
ATTORNEYS

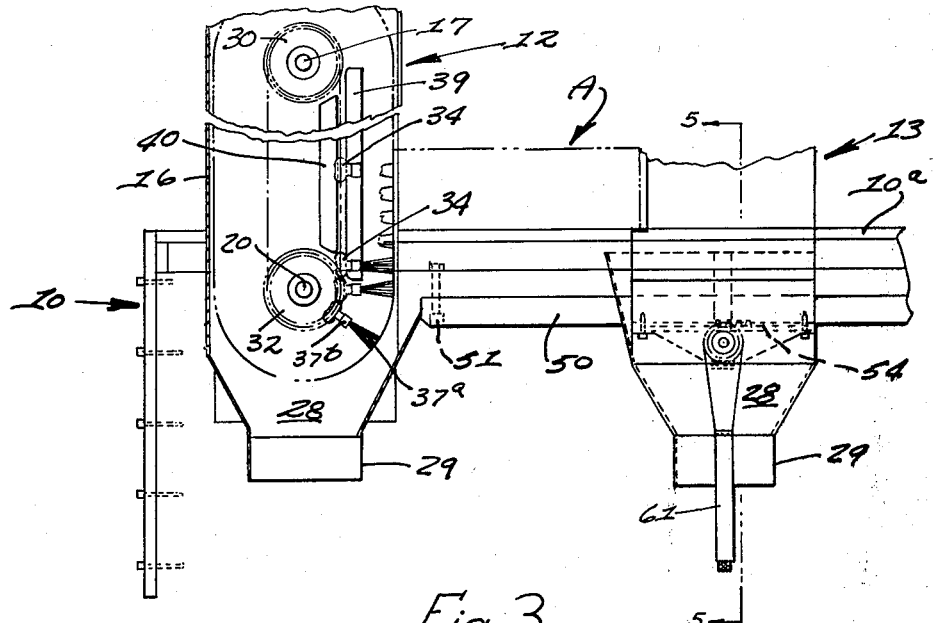
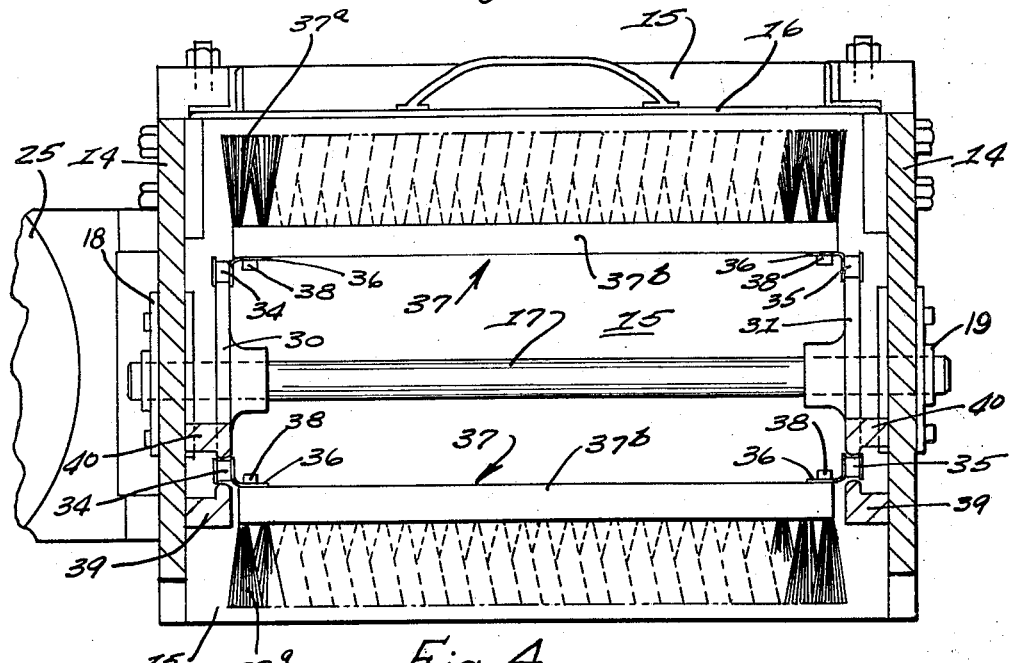

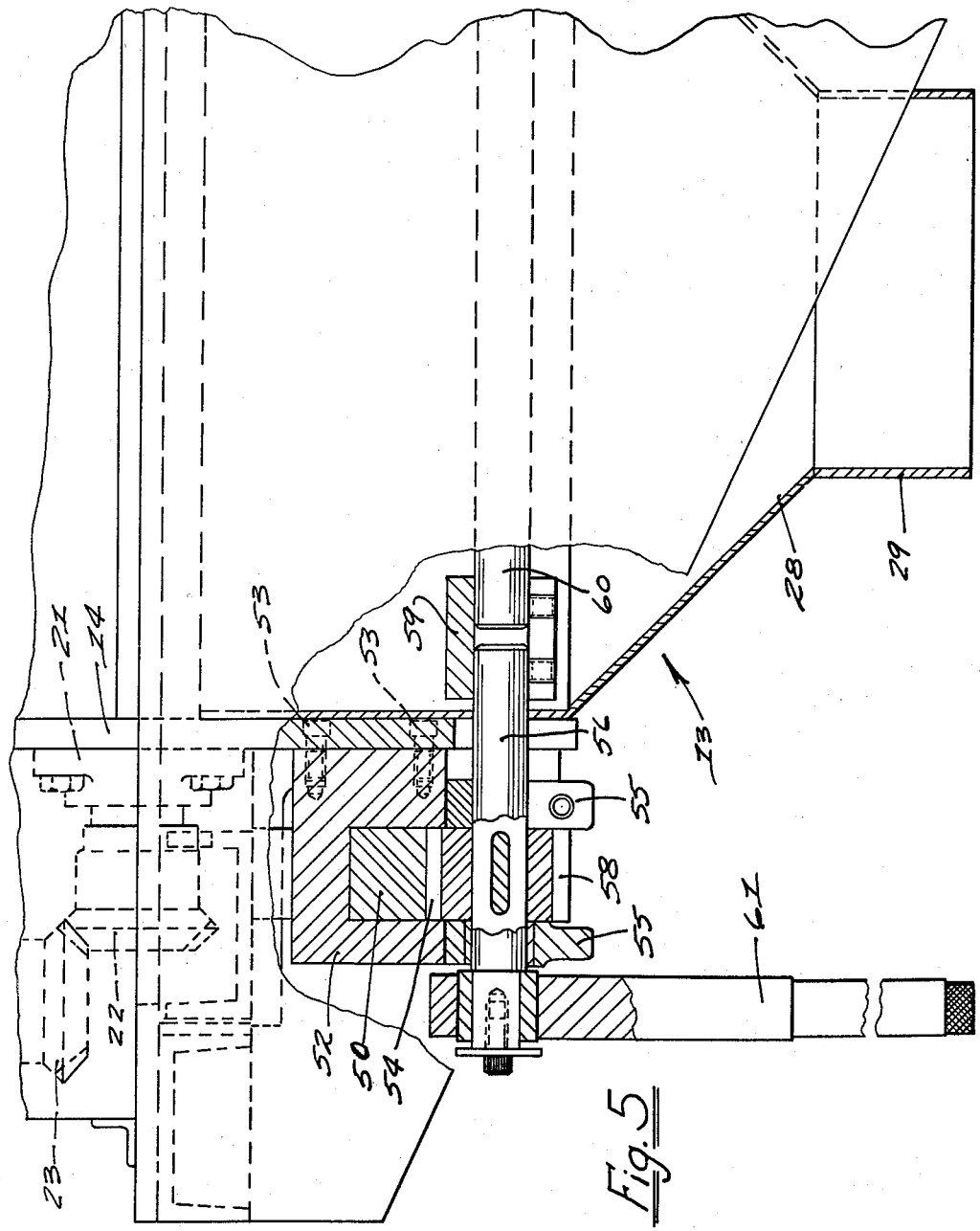

2,958,882

APPARATUS FOR CLEANING CORRUGATED PARTITION STRIPS

Francis A. McCormick and Glenn W. Maze, Toledo, Ohio, assignors to Owens-Illinois Glass Company, a corporation of Ohio Filed July 30, 1958, Ser. No. 752,072

2 Claims. (Cl. 15—77)

This invention relates to a means for cleaning dust particles and other foreign matter from sawed ends or edges of formed partition strips of corrugated board or the like, and more particularly, to apparatus for cleaning as by brushing any dust particles and other foreign matter from such partition strips subsequent to their being sawed to length or sawed and slotted, but prior to their assembly in containers or cartons.

In forming these partitions, strips of corrugated board or similar material are sawed into shorter lengths. As they are sawed, the strips are fed on edge in bundles through a saw and the sawed short lengths are then moved along a horizontal table surface. One example of this type of partition saw is described more fully in U.S. Patent No. 2,855,009, of F. A. McCormick. As part of the process in forming the partitions, the strips that are sawed to short lengths are compacted, while upright on edge, and moved between guides so as to pass over a plurality of slotting saws which cut a pattern of vertical slots in the strips. These slotted strips are later assembled in combination with other partition strips to form a gridwork of cells or rectangular compartments in a shipping container or carton. As is customary practice, the sawed and slotted partitions are moved along a horizontal table surface to a point where they are removed for later performing this partition assembly and insertion into the carton.

During the sawing and slotting of the partition strips, a hazard is created by dust particles of the corrugated material, paper fuzz or other foreign matter, clinging to the surfaces of the partition. This dust later dislodges during either handling and assembly operations or after assembly which causes uncomfortable and unhealthy dust conditions in the box plant, and moreover, any of the dust particles which carry over into the completed carton later contaminate the content of the carton. For example, in the glass bottle industry the cartons are filled with empty open bottles and then either stored for later shipment or shipped at that time to the bottler customer. During storage or transit, the dust particles that dislodge in the carton will be permitted to enter the bottles, creating a costly additional cleaning problem for the bottler customer prior to filling the bottles with content at his mechanized filling lines.

It is an important object of the present invention, therefore, to provide apparatus for efficiently and economically cleaning the loose dust particles and other foreign matter from the formed paper partitions after they are fed in a continuous bundle or charge from the partition saw by subjecting the partitions to a brushing action at the cut ends or edges of the partitions, thereby dislodging and removing such dust and foreign matter that may have been present.

Another object of this invention is the provision of apparatus, as just mentioned, that is adaptable for use with present partition sawing and slotting machinery to effectively clean the partitions of dust particles prior to handling, so as to overcome the above mentioned dust hazard both in the box plant and in connection with contamination of the content of assembled cartons.

Another object of the invention is to provide apparatus adapted for use with present partition sawing and slotting machinery for effecting removal of dust particles from the partitions formed thereby, this apparatus including brushing means for cleaning the sawed edge surfaces of the formed partition strips.

A further object of the invention is to provide such apparatus for effecting removal of dust particles from sawed and slotted partitions that is readily adjustable to accommodate various sizes or lengths of partitions.

Other objects and advantages of the present invention will become apparent from a reading of the following description of a preferred embodiment, the appended claims, and the accompanying drawings of the preferred embodiment to which reference is made, and in which:

Fig. 3 is a sectional end elevational view taken along line 3—3 of Fig. 2.

Fig. 4 is an enlarged sectional plan view taken along line 4—4 of Fig. 2.

Fig. 5 is an enlarged partial sectional side view taken along line 5—5 of Fig. 3, and shows details of the mechanism for adjusting the position of the right-hand brush assembly in Fig. 3 with relation to the left-hand brush assembly thereof.

Figure 1:
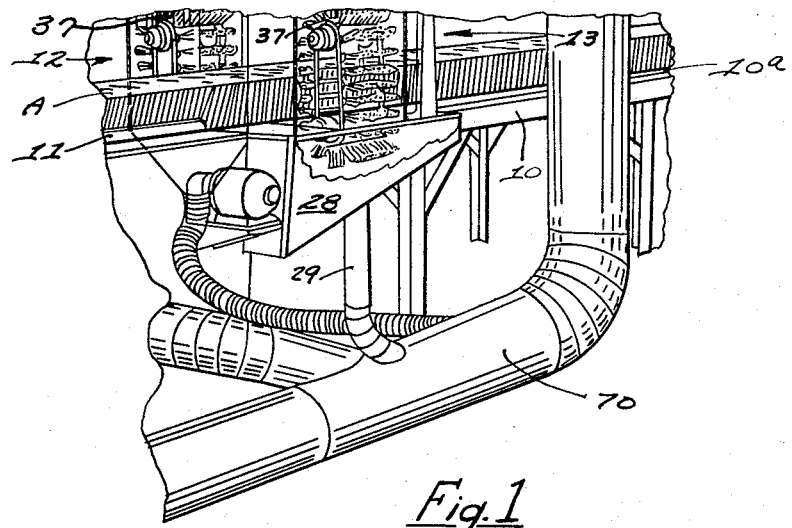
Fig. 1 is a perspective view, with portions broken away illustrating the novel apparatus of the present invention as it would appear in one form in operating position for cleaning an on-edge stack of corrugated partition strips cut to length and fed from a partition saw machine.

As a practical example for practicing the present invention, corrugated or like strips of material are sawed to length and thereafter may be also slotted on any suitable machine adapted for that purpose. Thereafter, the sawed lengths are moved in a continuous column or stack by pushing them while on an edge along a horizontal surface. The partitions of this stack are upright and in a closed side-by-side relationship such that they rest on the horizontal surface with their lengthwise dimension extending transversely of the direction of movement of the stack. The forward end of the stack is unrestricted in its movement in the horizontal direction. The forward or advancing movement of the stack may be either continuous or intermittent, however, the feeding movement herein contemplated is intended to be provided by the feed of the sawing machine or the sawing and slotting machine, whichever the case may be, which machine is not shown but may be readily understood by reference to the aforementioned copending application on a partition saw machine. Regardless of the manner in which the stack is advancing, the partitions will be fed through a cleaning area located along the horizontal supporting surface, such as a tabletop. While in the cleaning area, partition strips are subjected to a brushing action by the operation of the novel apparatus of this invention.

Apparatus is also provided in combination with the brush assemblies for receiving any removed dust particles dislodged and freed by the brushes. This removal system is contemplated as a means for conducting such waste and dust to a remote location for disposal to thereby keep the working area around the cleaning area clean and free of dust hazard.

Referring to the drawings, one novel form of the apparatus of the invention will now be described.

In Fig. 1, a table 10, which has a flat horizontal top surface 10a, is provided and has vertically extending side guides 11 defining a path of movement over the table top 10a for the stack or column of sawed partitions, this stack being referred to generally at A. Along one side of the table 10 is mounted a brush assembly, referred to generally at 12. Its mounting on the table is fixed along that one side of the table. A similar brush assembly 13 is mounted adjustably at the opposite side of table 10, the adjustment being provided to allow the assembly 13 to be shifted transversely of the direction of movement of the stack A and laterally of the table top 10a. Except for their mountings on table 10, both of the brush assemblies 12 and 13 are similarly constructed. This adjustable mounting for the assembly 13 will be described in detail hereinafter in conjunction with Fig. 5.

Figure 2:
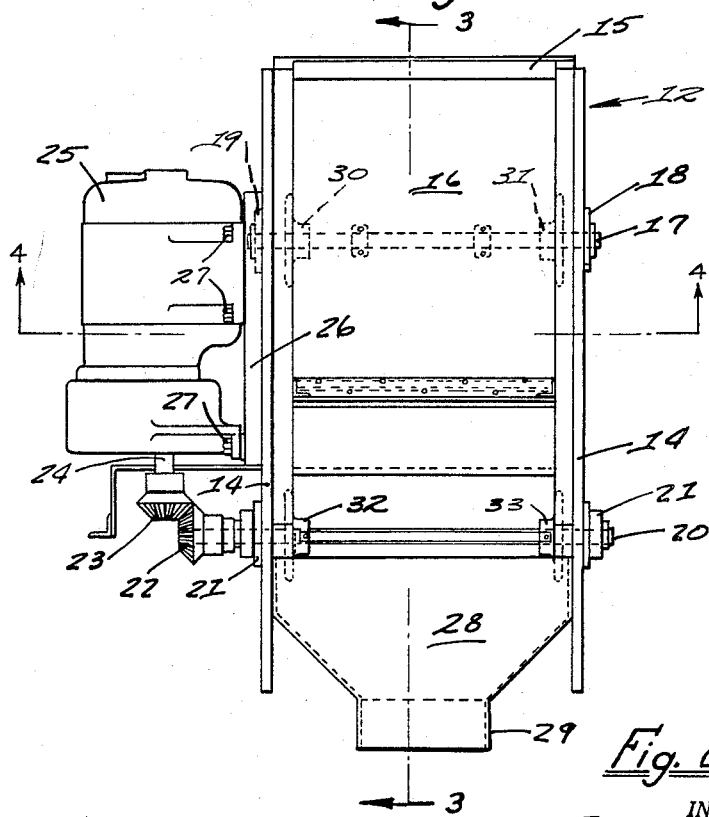
Fig. 2 is a side view of one of the brushing assemblies of the invention.

As seen in Fig. 2, the brush assembly 12 comprises a frame having parallel upright side members 14 and a top enclosure 15. The outside or front side of the brush assembly has a cover plate 16 which encloses it (Fig. 3). The innermost side of the frame, or the side nearest the partition stack A, has an opening for allowing the effective operation of the brushes, as soon will be described. A horizontal shaft 17 has journaled end mountings in bearings 18 and 19 which are held in the upright members 14 of each of the assembly frames. A second horizontal shaft 20 is similarly mounted in bearings 21 at a lower elevation in the vertical members 14 of the brush assembly frame. The outer extension of this shaft 20 has a bevel gear 22 keyed to it and gear 22 meshes with a corresponding bevel gear 23. Gear 23 is keyed onto the drive shaft 24 of an electric motor 25. The motor 25, as shown, is bolted to a mounting plate 26 fastened to one of the upright members 14 of the brush assembly as by bolts 27. Fastened between the lower ends of upright members 14 is a collector chute 28 which tapers to an outlet 29.

As is seen in Figs. 3 and 4, a pair of end sprockets 30 and 31 are keyed onto shaft 17. Similarly, the lower shaft 20 (Fig. 2) has a pair of similar sprockets 32 and 33 keyed to it. A roller chain 34 (Figs. 3 and 4) is reeved over the sprockets 30 and 32. A similar roller chain 35 is reeved over the sprockets 31 and 33. At spaced apart links of the roller chains 34 and 35, integral brackets 36 are provided on the links of the chains for mounting brush elements 37. As shown, the brush elements are bolted by studs 38 to the brackets 36. Each of the brush elements 37 is provided with a horizontal strip of overlapping bunches of bristles, indicated as 37a, which are retained in the horizontal bar 37b of the brush elements. As the lower shaft 20 is driven in the proper direction by the motor 25, the brush elements 37 are carried in endless fashion through a path described by the chains 34 and 35 traveling around their respective sprockets on shafts 17 and 20. The just-described operation comprises an endless carriage element for travel in an endless fashion for the brushes. As seen on Fig. 3, in their travel, the brushes pass through a span which brings the bristles in contact with the edge surfaces of the partitions in the stack A that is adjacent the open innerside of the brush assembly and defines the cleaning area. In the preferred construction, each of the brush assemblies 12 and 13 are set in a spaced apart relationship so that the bristles of the brush elements 37 have about ⅛ of an inch interference with the edge surfaces of the partition strips of the stack A.

As indicated hereinbefore, the brush assemblies are used in pairs preferably, so that one assembly is operable for brushing one end edge of the partition strips and the other assembly is operable for brushing the opposite edge surface. This arrangement will be usually the preferred set-up, inasmuch as both of the opposite edges of the partition strips will have been sawed and in all probability need to be cleaned of corrugated dust and other waste. If it should become desirable, however, the device may be arranged by the use of only one brushing assembly, whereby but one edge surface of the partitions is cleaned. It is also contemplated that the brush assemblies may be multiplied in number so that all of the edge surfaces of the partition strips are cleaned.

In the arrangement illustrated, the fixed brush assembly 12 will be driven by its motor 25 so that the shaft 20 and its driving sprockets 32 and 33 rotate in a clockwise direction (Fig. 3), and thus, impart travel of the brushes through a clockwise substantially circuitous path of endless movement. The adjustable assembly 13 will be driven by its motor 25 to travel the brushes in the opposite direction or counterclockwise (Fig. 3). In each of the brush assemblies 12 and 13, their two roller chains 34 and 35 travel in vertical end guides 39 and 40. These end guides 39 and 40 extend over the span of the path of movement for the brush elements 37 corresponding at least to the portion of their travel during which time the bristles 37a are in engagement with the partitions A. The guides supply a back-up support for the chain to keep it from yielding in a direction away from the partitions and thereby make the brushing action firm or positive.

As seen on Figs. 3 and 5, assembly 13 is mounted to slide on a pair of parallel transverse ways 50 bolted to the underside of the table 10 by bolts 51. A pair of corresponding slide members 52, which are parallel, are bolted to an upright member 14 of the frame of brush assembly 13 by studs 53. These slides 52 ride over ways 50. The underside of ways 50 are provided with a rack gear segment 54. A bushing bracket 55 is integrally attached to the underside of the slides 52. The brackets 55 are provided to receive a horizontal shaft 56 and a pinion 58 is keyed on shaft 56 for rotation therewith. On the drawings (Fig. 5), only the left-hand way 50, slide 52, etc., are shown, however, it should be obvious from this description that a similar way 50, slide 52, bracket 55, rack gear 54, and shaft 56 are provided under the right-hand side of the brush assembly 13. The inner end of each shaft 56 is coupled by a pair of couplings 59 (the right-hand coupling not shown) to a connector shaft 60. Shaft 60 and the two couplings 59 connect the two end shafts 56 together for rotation together. The shaft 56, shown at the left-hand side of Fig. 5, is provided with a ratchet handle 61. Through the use of the handle 61, the proper direction of rotation may be imparted to the shafts 56 to turn pinion 58 in the direction desired for adjusting the position of the brush assembly 13 along the pair of parallel ways 50 (Fig. 3). Two racks on ways 50 and pinions 58, driven simultaneously, are provided to prevent the slides 52 from binding on the ways 50. However, it is easy to design and is possible to operate the adjustment mechanism by only one rack and pinion arrangement, because adjustments of size are relatively infrequently made in actual practice.

Thus, in any event is provided a means for adjusting one of the brush assemblies in and out transversely to the direction of the stack A over the table top 10a so that the brush assemblies 12 and 13 may be spaced apart at the proper operating positions for any length of partitions that is being fed in the stack A.

As previously mentioned, a dust accumulator system is provided. Each of the collector chutes 28 on the brush assemblies 12 and 13 have their outlets 29 connected into a main collector duct 70 (Fig. 1). The main duct 70 extends to a remote location. The main duct may be connected to a suction fan (not shown) for evacuating the air from the main duct and causing air movement in the duct in a direction away from the brush assemblies. Provision of a suction fan or intake fan operatively connected in the main duct should be apparent to a skilled mechanic, and hence, is not shown on the drawings or described herein in detail. Thus, as the brushing elements are operated and engaged to brush loose the dust particles from the stack A of partitions, the particles are driven into the collector chute 28 of each brush assembly, then through the chute outlets 29, and suction in the main duct will conduct these particles to the aforementioned remote location for collection and disposal.

Various modifications may be resorted to within the spirit and scope of the appended claims.

We claim:

1. Apparatus for cleaning the ends of sawed strips of corrugated material of the class described, said strips being cut to predetermined length and supplied in a compacted arrangement in the form of a horizontally disposed on-edge stack which is advanced continuously in a horizontal direction comprising a table having a horizontal top surface for receiving and supporting said stack, opposed brush assemblies, each said assembly comprising a frame, upper and lower horizontal shafts rotatably mounted and vertically disposed one above the other on said frame, spaced apart sprockets on each of said shafts, a pair of endless chains in running engagement about sprockets on the upper and lower shafts, respectively, a plurality of brush elements, fastened at opposite sides to the chains for carriage thereby to contact adjacent edges of the said strips as they are advanced along the table top, a motor driveably connected to one of the said shafts of each of the assemblies for moving the brushes in a vertical circuitous path past the moving strips of said stack, vertical guides engaging each of said chains and extending throughout the height of the said strips and disposed at right angles to the advancing movement of these said strips, said guides serving as a back-up support for the brush elements to provide a firm brushing action by the latter as they are driven in contact with the said strips, means for fastening one of said brush assemblies to the table in a fixed position, and means for slideably fastening the other of said brush assemblies to the table, said last-mentioned means comprising a slide transversely of said table and means cooperating with said slide for adjusting the operating position of the latter mentioned brush assembly by sliding movement toward and away from the said one of the brush assemblies.

2. The apparatus defined in claim 1, wherein the said last-mentioned means for adjusting the said other brush assembly comprises cooperating slides rigid on the frame of said other assembly and in slidable engagement on said slide of the table, rack gear segment fixed with respect to said table slide and parallel thereto, a rotatable pinion, a rotatable mounting for the pinion on the frame of said other assembly adapted to mesh said pinion with the rack gear segment, and means for imparting rotation to said pinion in either direction for propelling said other frame assembly correspondingly in sliding movement along said table slide, whereby the lateral position of said other assembly on said horizontal support is adjustable, at will, to an operating position with respect to said stack of strips being advanced longitudinally of the top surface of said table.

References Cited in the file of this patent

UNITED STATES PATENTS

| | | |
|---|---|---|
| 968,726 | Wysong | Aug. 30, 1910 |
| 1,180,172 | Mitchell | Apr. 18, 1916 |
| 1,648,794 | Wenzel et al. | Nov. 8, 1927 |
| 2,158,694 | Fenton | May 16, 1939 |
| 2,531,009 | Stuart et al. | Nov. 21, 1950 |
| 2,597,416 | Weber | May 20, 1952 |
| 2,714,278 | Dostert | Aug. 2, 1955 |